(No Model.) 4 Sheets—Sheet 1.
F. J. SPRAGUE.
ELECTRIC RAILWAY MOTOR.
No. 429,327. Patented June 3, 1890.
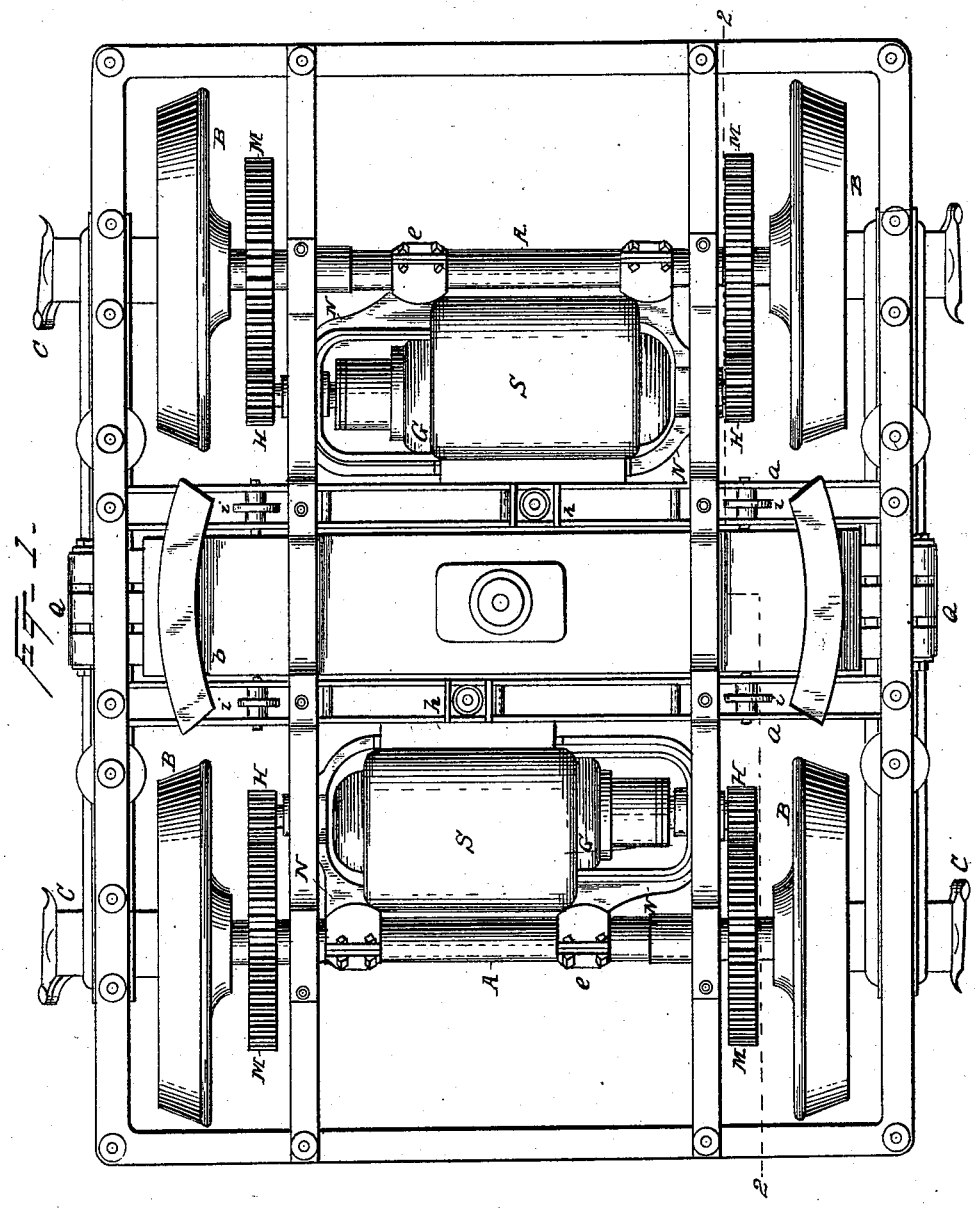

(No Model.) 4 Sheets—Sheet 2.
F. J. SPRAGUE.
ELECTRIC RAILWAY MOTOR.
No. 429,327. Patented June 3, 1890.
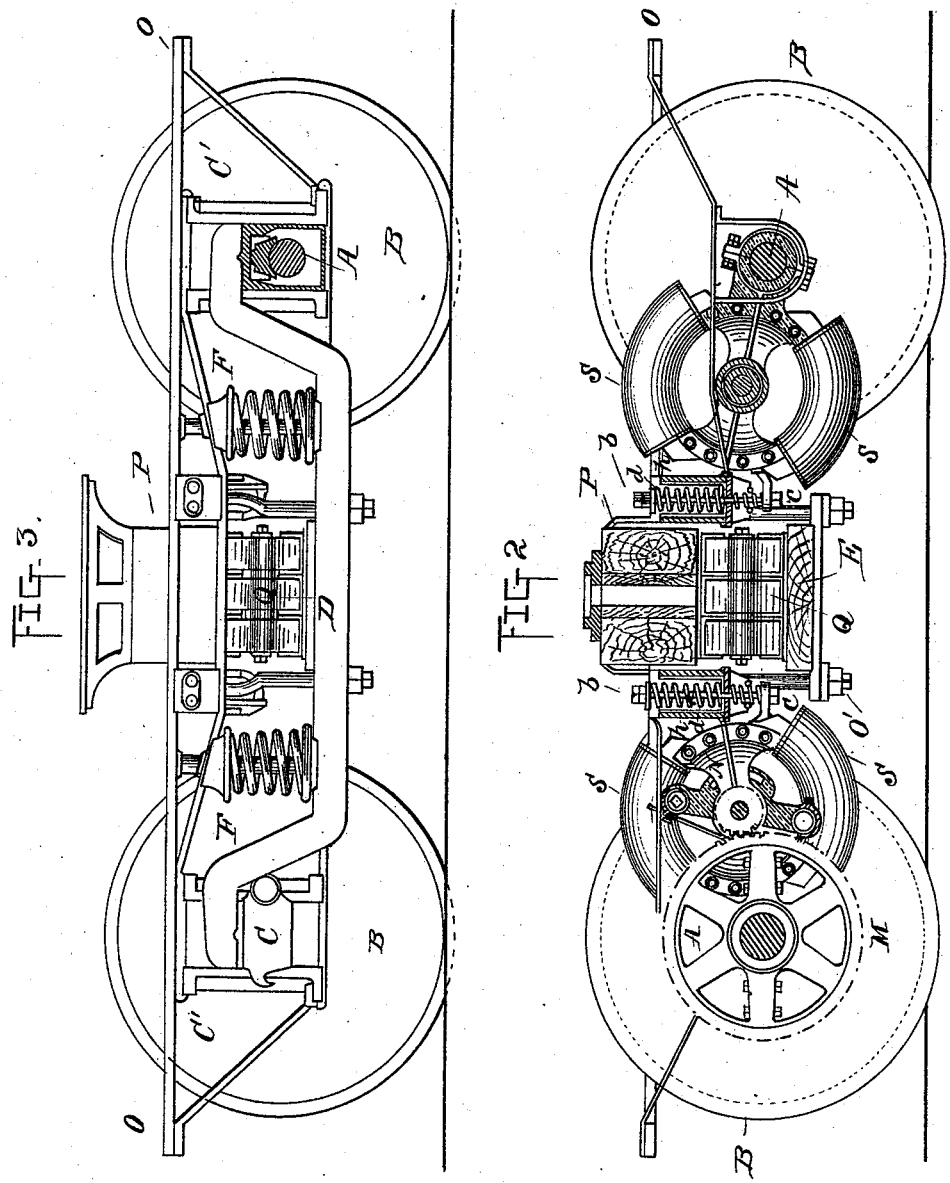
WITNESSES: INVENTOR
Frank J. Sprague
BY
ATTORNEYS (No Model.) 4 Sheets—Sheet 3.
F. J. SPRAGUE.
ELECTRIC RAILWAY MOTOR.
No. 429,327. Patented June 3, 1890.
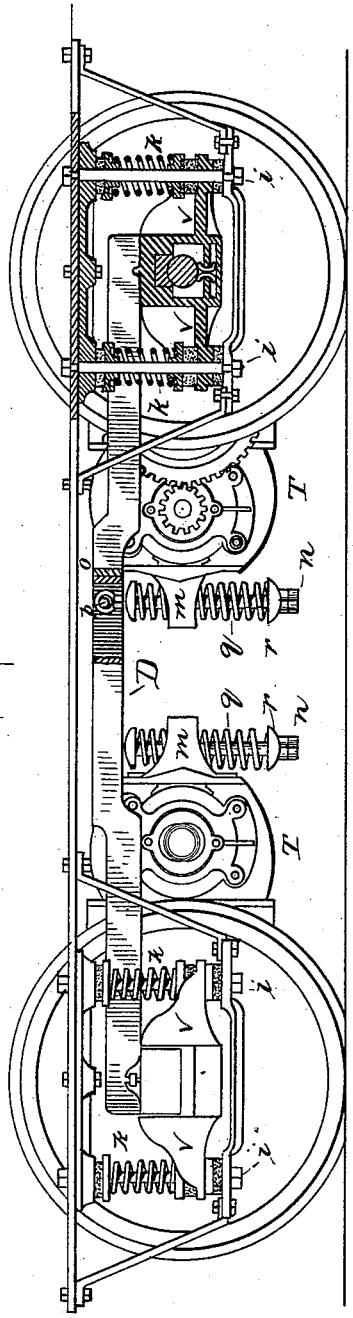
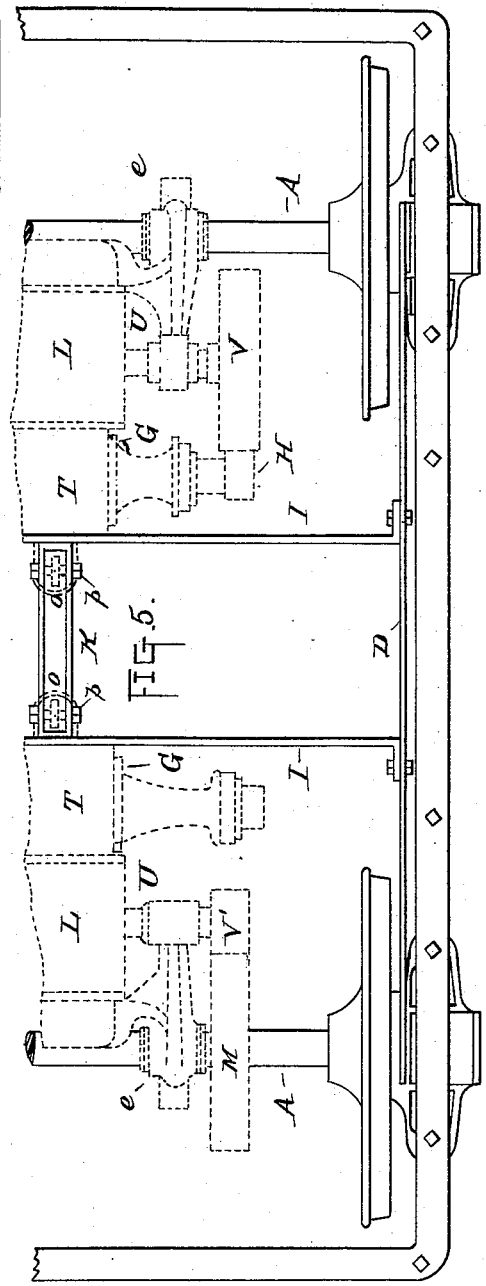
WITNESSES:
INVENTOR
Frank J. Sprague
BY
ATTORNEYS.

(No Model.) 4 Sheets—Sheet 4.
F. J. SPRAGUE.
ELECTRIC RAILWAY MOTOR.
No. 429,327. Patented June 3, 1890.
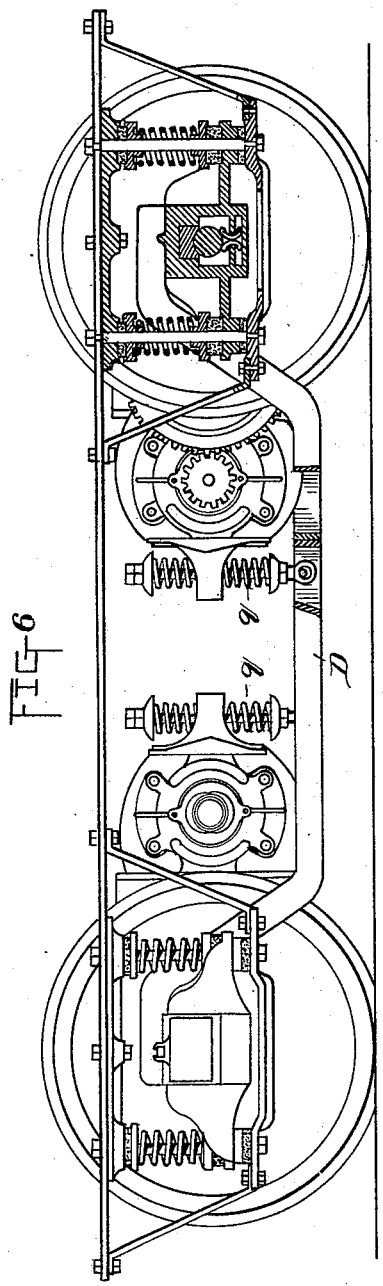
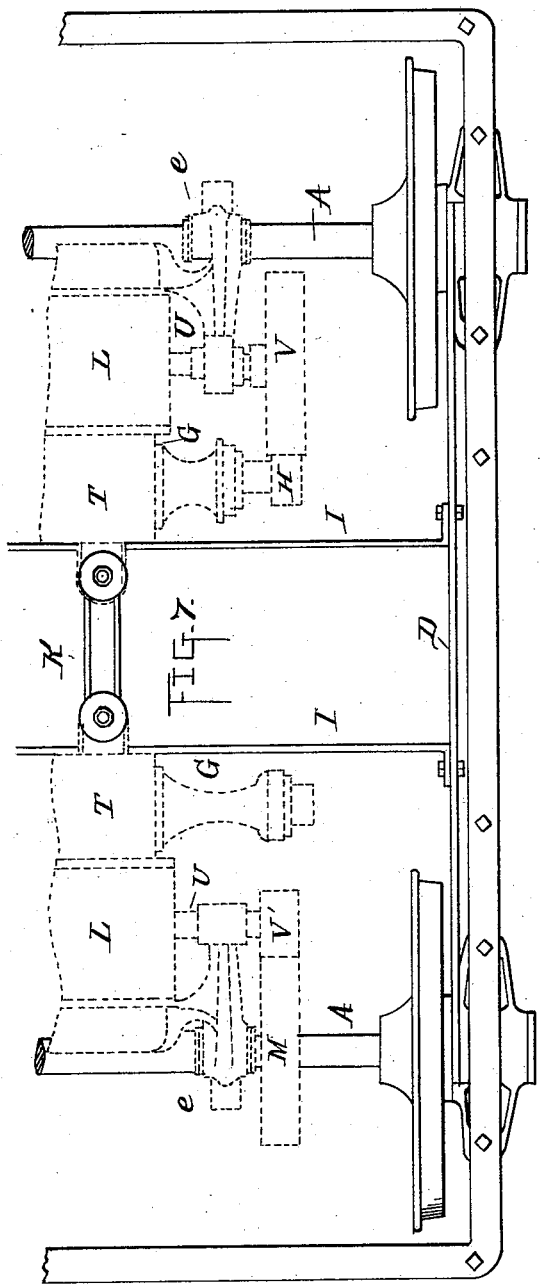
WITNESSES:
INVENTOR
Frank J. Sprague
BY
ATTORNEYS.

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY, OF SAME PLACE.

ELECTRIC-RAILWAY MOTOR.

SPECIFICATION forming part of Letters Patent No. 429,327, dated June 3, 1890.

Application filed October 31, 1889. Serial No. 328,795. (No model.)

*To all whom it may concern:*

Be it known that I, FRANK J. SPRAGUE, a citizen of the United States, residing at New York city, in the county and State of New York, have invented a certain new and useful Improvement in Electric-Railway Motors, of which the following is a specification.

My invention relates to the propulsion of cars or vehicles by means of electric motors supported upon the same and receiving current from any suitable source in any known or suitable manner.

More especially my invention relates to the manner of supporting a motor or motors upon a vehicle, my objects being, mainly, to furnish a secure and convenient attachment and arrangement for the motor or motors; to economize space; to make the springs which support the car-body independent of the weight or the movements of the motor and the motor or motors independent of the movements of the car-body on its springs; to distribute the weight of the motors as evenly as possible; to make the point of support for the motor or motors such that they will have the minimum of bodily movement, and to provide for constant effective engagement of the gearing which transmits motion from motor-shafts to driving-axles.

The main feature of my invention consists in making use of the vertically-movable axle-boxes upon which the truck-frame or car-body is supported by springs or flexible supports as a support also for the motor or motors, the suspension or support of such motor or motors being also preferably through springs or flexible supports. When my invention is thus applied to a truck of that kind which is detachable from the car-body it results in the production of a motive truck for a car, which truck contains entirely within itself the motive power for propelling the car, and which truck supports the car-body and the motor or motors by independent flexible supports. I prefer that the support for the motor or motors shall not be directly upon the axle-boxes, but upon a frame joining such axle-boxes mechanically. Many railway-car trucks are constructed with such frames consisting of side pieces or equalizing-bars joining axle-boxes, on each side of the truck or vehicle, and a cross-frame supported by springs from said side pieces or boxes and joining them together, and upon which through springs the car-body is supported. In applying my invention to trucks of this character I support the motor or motors flexibly upon the said cross-frame; but in ordinary street-car trucks the axle-boxes are not so joined, and therefore in applying my invention to these or in specially constructing trucks or cars according to my invention I join the axle-boxes on each side by side pieces or equalizing-bars and join the two equalizing-bars by a cross-bar, beam, or frame, which I make the immediate support for the motor or motors, preferably through springs or otherwise flexibly. By supporting the motor or motors thus centrally from all the axle-boxes such motor or motors receive the smallest possible amount of movement therefrom.

I prefer to support the motor at one end only upon the axle-boxes, as just set forth, while at its other end I center it upon the axle, with which its armature-shaft is mechanically geared or connected by means of extensions or portions of its field-magnet sleeved upon such axle, as set forth generally in my patent, No. 324,892, dated August 25, 1885.

I usually prefer to provide each truck or vehicle with a plurality of motors—that is to say, more than one—and I support each motor by a flexible support independently of the others, whereby each is capable of bodily movement without interfering with or affecting another.

I prefer to use two motors placed between two driving-axles of a truck or vehicle and flexibly supported end to end at or near the middle part of the truck or vehicle and extending each lengthwise of the vehicle toward one of the said axles, upon which axle it is centered, as above stated, and with which its armature-shaft is mechanically connected or geared, a common support for the motors being formed by the said frame, bar, beam, or other part or structure which forms a connection between the two equalizing-bars.

My invention is illustrated in the accompanying drawings.

Figure 1 is a top plan view of a truck embodying my invention; Fig. 2, a longitudinal vertical section of the same on the line 2 2 of Fig. 1; Fig. 3, a side elevation of the truck with the motors omitted; Fig. 4, a side elevation and partial section of another form of truck embodying my invention; Fig. 5, a top view of a part of the same truck; Fig. 6, a side elevation showing the use of my invention with another arrangement of equalizing-bars, and Fig. 7 a top view of a portion of the same.

The truck shown in Figs. 1, 2, and 3 is a bogie-truck of the character in which the car-body has a pivotal movement upon the center of the truck.

A A are driving-axles of the truck, and B B the wheels thereof, the axles turning in axle-boxes C outside the wheels, and the axle-boxes being vertically movable in pedestals C'. From one axle-box to the other on each side extends the equalizing-bar D, such bars being so attached to or supported upon the axle-boxes at their ends as to have a limited play or movement. The frame O is supported from the bars D by heavy spiral springs F F.

E is the spring-board or sand-board hung from longitudinal girders of the frame O by stirrups O'. The elliptic springs Q are mounted upon the board E and carry the cross-bolster P, which carries the pivoting-support for the car-body.

The electric motors are circular in form, S S being the field-magnet windings, and G the armature. The motors are each sleeved on the driving-axle at one end of the truck at two points e, and brackets N, extending from one pole-piece to the other, support the armature-shaft. Upon each end of each armature-shaft is a pinion H, and these pinions engage gear-wheels M on the driving-axles to turn the same.

From one side of frame O to the other and before and behind the springs Q there extends a pair of cross-bars a, and from these cross-bars the motors are flexibly supported. A bolt b, passing through a lug c, projecting from the motor, passes also through a box h, which is supported from the pair of cross-bars a, and within said box h is a spring d, so that through the bolt b and the spring d and cross-bars a, frame O, and springs F, the motors are flexibly supported from the equalizing-bars which are connected with the axle-boxes.

The arrangement just described is shown and described in my application, No. 301,683, filed March 1, 1889, but is not claimed therein.

Figs. 4 and 5 show a street-car truck in which the equalizing-bar D extends on each side directly from the top of one axle-box to the top of the other. In this arrangement the springs which support the truck-frame and car-body, instead of being attached to the equalizing-bars, are connected with arms v, which extend from the lower portion of the axle-box, and through which pass bolts i, around which the springs k are coiled. At the middle of the car between the motors two cross-bars I I extend from one equalizing-bar to the other, and at the center of the car the bars I I are joined by the frame K, which is the part which carries the motors directly.

The motors shown in Figs. 4 and 5 are of different character from those in the preceding figures, being U-shaped motors with one branch L of the field-magnet situated above the other and having curved pole-pieces T, which inclose the armature G. At the keeper of the field-magnet or end farthest from the pole-pieces each magnet is sleeved upon the driving-axle A at two points, one on each side of the motor. The sleeving support is shown on only one side in the drawings, only a portion of the truck being shown in Fig. 5; but it will be understood that the arrangement is precisely the same on both sides. A bracket extends from the keeper on each side, formed or provided with a sleeve e, inclosing the axle, and such brackets in the form shown form also supports for counter-shafts U. In the arrangement shown, instead of a pinion at each end of each armature-shaft, each of such shafts has a pinion H at one end only, which engages a gear-wheel V on the counter-shaft U, while at the other end of each counter-shaft a pinion V' engages a gear-wheel M on the driving-axle. At the inner end of each motor it has a lug or projection m extending from it, through which passes a bolt n, which is hung by an eye o on a pin p, extending across the frame K, and upon this bolt, above and below the lugs m, is a spring q, bearing at its lower end against a head r on the lower end of said bolt. It will be seen that the motors are thus independently flexibly supported from the frame carried by the equalizing-bars and axle-boxes, and the car-body is supported also from the axle-boxes upon springs independently of the motors.

The arrangement shown in Figs. 6 and 7 differs from that just described in the arrangement of the equalizing-bar, which extends from the top of one axle-box to the top of the other, but instead of passing straight across, as in Fig. 4, it curves downwardly at the middle of the car below the motors, and this makes it necessary to suspend the motors from below instead of from above. Such suspension is, however, accomplished in the same way, as before described, by means of the cross-bars I, frame K, and springs q.

It will readily be seen that many different forms and arrangements can be given to the equalizing-bars, and that they may be connected with the axle-boxes in various ways and to the bottom or other part as well as to the top of said axle-boxes. The arrangement of the cross-frame, bar, beam, or other connection between the equalizing-bars and other mechanical details of construction may also be varied without departing from my invention.

By the employment of the features of construction described, I produce a compact, strong, and simple structure and arrangement, in which the motors are not materially affected by each other's movements or by the weight or movements of the car-body, and neither are the car-springs affected by the weight or movements of the motor or motors, in which the motors are so supported that their weight is well distributed and that they have the minimum amount of bodily movement upon their supporting parts, and in which the engagement of the gearing between armature-shafts and axles is effectively provided for and maintained.

I do not claim herein centering the motor on the driving-axle at its keeper or end farthest from its pole-pieces, or any features of invention dependent upon or relating to this general feature, since these matters form the subject of my application filed March 1, 1889, Serial No. 301,683. Nor do I claim herein supporting an electric motor flexibly upon a truck provided with springs for supporting the car-body and independently of such car-springs, these features being claimed in my application filed June 11, 1889, Serial No. 313,874.

What I claim is—

1. The combination, with a wheeled truck or vehicle having vertically-movable axle-boxes, of a frame joining the axle-boxes together mechanically and an electric motor supported by said frame and having its armature-shaft mechanically connected with an axle of the vehicle, substantially as set forth.

2. The combination, with a wheeled truck or vehicle having vertically-movable axle-boxes, of a frame composed of side pieces joining together the axle-boxes on the same side of the truck or vehicle, and parts connecting said side pieces together, and an electric motor carried by said frame and mechanically connected with an axle of the truck or vehicle, substantially as set forth.

3. The combination, with a wheeled truck or vehicle having vertically-movable axle-boxes, of an electric motor flexibly supported from said axle-boxes and having its armature-shaft mechanically connected with an axle of the vehicle, substantially as set forth.

4. The combination, with a wheeled truck or vehicle having vertically-movable axle-boxes, of an electric motor supported from such axle-boxes and centered upon an axle of the vehicle, and having its armature-shaft mechanically connected with such axle, substantially as set forth.

5. The combination, with a wheeled truck or vehicle having an equalizing-bar extending from one movable axle-box to another, of an electric motor carried by such equalizing-bar and having its armature-shaft mechanically connected with an axle of the vehicle, substantially as set forth.

6. The combination, with a wheeled truck or vehicle having an equalizing-bar extending from one movable axle-box to the other on each side of the truck or vehicle and a cross piece or frame joining said equalizing-bars, of an electric motor supported by said cross-piece or frame, substantially as set forth.

7. The combination, with a wheeled truck or vehicle having an equalizing-bar extending from one movable axle-box to the other on each side of the truck or vehicle and a cross piece or frame joining said equalizing-bars, of an electric motor flexibly supported by said cross piece or frame, substantially as set forth.

8. The combination, with the movable structure formed by the axle-boxes and equalizing-bars, of the truck-frame or car-body supported from said movable structure on springs and an electric motor carried by said structure and having its armature-shaft mechanically connected with an axle of the vehicle, substantially as set forth.

9. The combination, with the movable structure formed by the axle-boxes and equalizing-bars, of the truck-frame or car-body supported from said movable structure on springs and an electric motor carried on springs by said structure and having its armature-shaft mechanically connected with an axle of the vehicle, substantially as set forth.

10. The combination, with a wheeled truck or vehicle having vertically-movable axle-boxes, of equalizing-bars extending from one axle-box to the other on each side, a cross piece or frame joining the two equalizing-bars, and an electric motor supported at one end by said cross piece or frame and having its other end centered on an axle of the vehicle, with which the armature-shaft of the motor is mechanically connected, substantially as set forth.

11. The combination, with a wheeled truck or vehicle having vertically-movable axle-boxes, of equalizing-bars extending from one axle-box to the other on each side, a cross piece or frame joining the two equalizing-bars at the middle part of the truck or vehicle, and two electric motors, each of which is supported at one end by said cross piece or frame and at its other end is centered upon one of the axles of the vehicle, with which its armature-shaft is mechanically connected, substantially as set forth.

12. The combination, with a wheeled truck or vehicle having vertically-movable axle-boxes, of equalizing-bars extending from one axle-box to the other on each side, a cross piece or frame joining the two equalizing-bars, and an electric motor flexibly supported at one end by said cross piece or frame and having its other end centered on an axle of the vehicle, with which the armature-shaft of the motor is mechanically connected, substantially as set forth.

13. The combination, with a wheeled truck or vehicle having vertically-movable axle-boxes, of equalizing-bars extending from one axle-box to the other on each side, a cross piece or frame joining the two equalizing-bars at the middle part of the truck or vehicle, and two electric motors, each of which is flexibly supported at one end by said cross piece or frame, and at its other end is centered upon one of the axles of the vehicle, with which its armature-shaft is mechanically connected, substantially as set forth.

This specification signed and witnessed this 30th day of October, 1889.

FRANK J. SPRAGUE.

Witnesses:
WILLIAM PELZER,
H. W. SEELY.